United States Patent [19]
Romani

[11] Patent Number: 5,603,602
[45] Date of Patent: Feb. 18, 1997

[54] PRESSURIZED BALL BEARING ASSEMBLIES

[75] Inventor: Giuseppe Romani, Mississauga, Canada

[73] Assignee: Pratt & Whitney Canada Inc., Longueuil, Canada

[21] Appl. No.: 287,393

[22] Filed: Aug. 8, 1994

[51] Int. Cl.$^6$ .................................................. F01D 3/04
[52] U.S. Cl. .......................... 415/105; 415/107; 415/229; 384/517
[58] Field of Search .................................. 415/104, 105, 415/107, 129, 132, 133, 170.1, 174.2, 229; 384/517, 556, 563

[56] References Cited

U.S. PATENT DOCUMENTS

| | | | |
|---|---|---|---|
| 3,222,991 | 12/1965 | Bone | 384/517 |
| 3,574,424 | 4/1971 | Hagemeister . | |
| 3,943,803 | 3/1976 | Hafla | 384/563 |
| 4,159,888 | 7/1979 | Thompson . | |
| 4,268,220 | 5/1981 | Malott . | |
| 4,490,622 | 12/1984 | Osborn . | |
| 4,578,018 | 3/1986 | Pope . | |
| 4,626,111 | 12/1986 | Swasey et al. | 384/563 |
| 4,676,667 | 6/1987 | Komatsu et al. . | |
| 5,051,005 | 9/1991 | Duncan | 384/517 |
| 5,102,295 | 4/1992 | Pope . | |
| 5,237,817 | 8/1993 | Bornemisza et al. | 415/229 |
| 5,433,584 | 7/1995 | Amin et al. | 415/229 |

FOREIGN PATENT DOCUMENTS

| | | | |
|---|---|---|---|
| 931904 | 7/1963 | United Kingdom . | |
| 965465 | 7/1964 | United Kingdom . | |
| 2107002 | 4/1983 | United Kingdom | 384/517 |
| 2183736 | 6/1987 | United Kingdom . | |
| 8603549 | 6/1986 | WIPO | 415/9 |

*Primary Examiner*—Edward K. Look
*Assistant Examiner*—Christopher Verdier
*Attorney, Agent, or Firm*—James M. Rashid; Jeffrey W. Astle

[57] ABSTRACT

A pressurized bearing assembly for turbomachines like gas turbine engines wherein pressurized oil is used to apply an axial force to the outer bearing race of a ball bearing assembly. The force is transmitted through the race to the ball bearings and to the inner race of the bearing assembly, and is further transmitted, via the engine shaft, to the bearings of another, axially spaced apart bearing assembly. The force moves the balls in both assemblies into line-on-line running contact with their respective bearing races, and minimizes vibration in the assemblies.

4 Claims, 1 Drawing Sheet

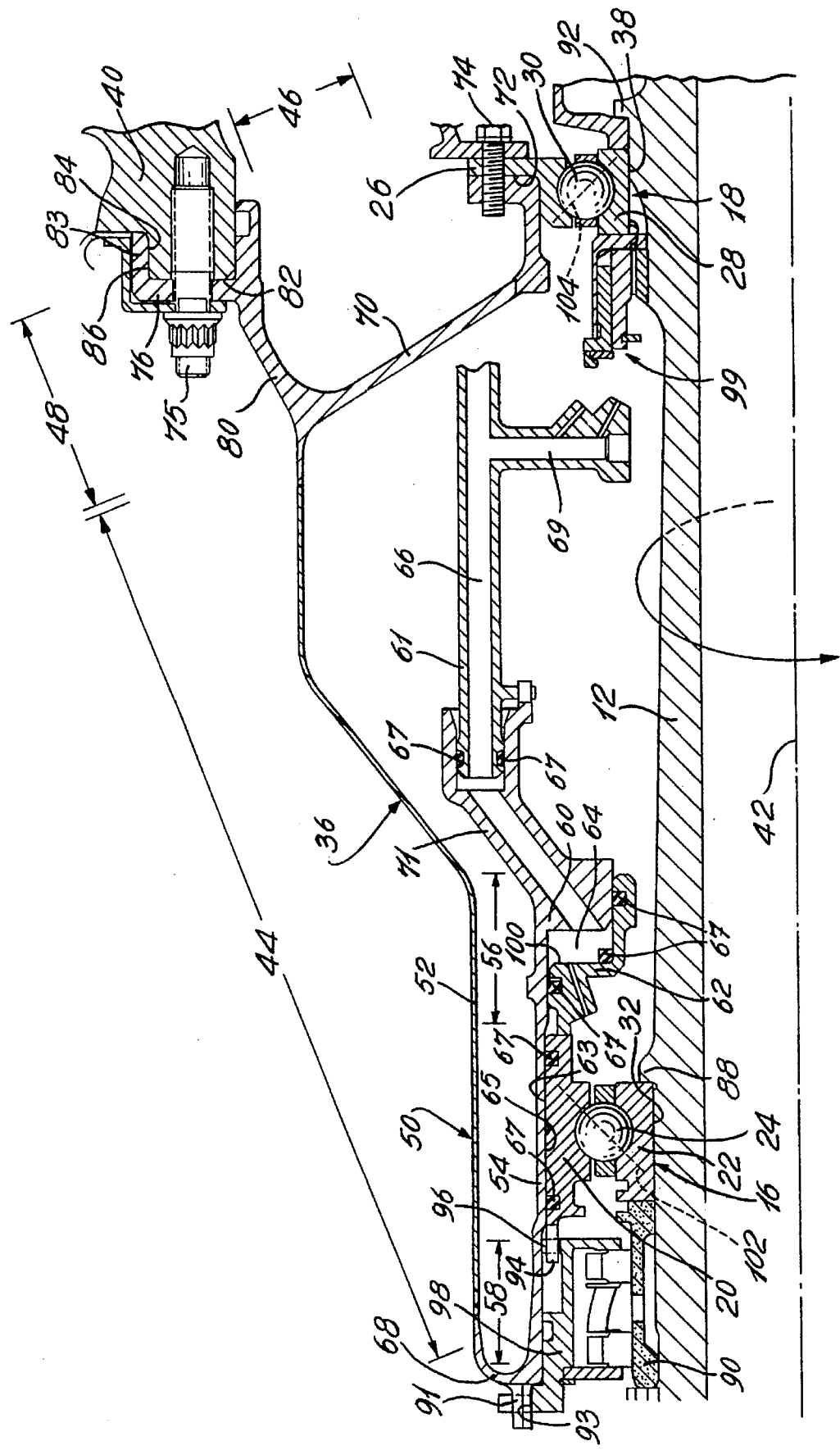

PRESSURIZED BALL BEARING ASSEMBLIES

TECHNICAL FIELD

This invention relates to gas turbine engines, and in particular, to ball bearing assemblies for gas turbine engines. Most particularly, the invention relates to pressurized ball bearing assemblies.

BACKGROUND OF THE INVENTION

Turbomachines such as gas turbine engines include a fan section, a compressor section, a combustion section, and a turbine section. A shaft extends axially through the engine from the fan section through the turbine section and rotates axially spaced apart stages of disks; the shaft is typically supported by two axially spaced apart bearing assemblies that are connected to the case by a bearing support housing. In many engine designs, a combination of ball and roller bearings are used, although the use of two ball bearing assemblies is known. A key requirement of any bearing assembly is that it supports the shaft in such a manner that vibration of the bearings as well as the shaft during engine operation is minimized, even at very high shaft rotation speeds.

Typically, during the operation of an aircraft gas turbine engine, a load is applied to one or both of the radially spaced apart bearing races that surround the bearings therebetween. Application of a load onto the races brings them into line-on-line running contact with their respective balls, thereby reducing the vibration that would otherwise take place within the bearing assembly. It is known to use air pressure to load the bearings; however, the application of air pressure can be unreliable, because during engine operation, the magnitude of the applied pressure may be too low to effectively load the bearings, which can result in excessive vibration of the bearings and the shaft, which can generate an undesirable level of noise within the aircraft cabin.

In addition to the air pressurizing method for loading bearing structures, other designs are shown in U.S. Pat. Nos. 3,574,424, 4,159,808, 4,268,220, 4,578,018, and 5,105,295. Notwithstanding the existence of these designs, improved designs are required to provide optimum operating characteristics for advanced engines. The present invention satisfies this industry need.

SUMMARY OF THE INVENTION

This invention pertains to a turbomachine comprising a shaft supported by first and second axially spaced apart ball bearing assemblies within an engine case, wherein each bearing assembly is comprised of a pair of radially spaced apart bearing races and a plurality of ball bearings therebetween. The turbomachine of this invention includes a bearing housing fixed to the engine case, wherein the radially outer bearing race of the upstream bearing assembly is axially moveable with request to the housing, and the radially outer bearing race of the downstream bearing assembly is axially and rotationally fixed to the housing; the radially inner bearing race of each bearing assembly is fixed to the shaft. According to the invention, a force is applied in the axially upstream direction to the outer bearing race of the upstream bearing assembly. The force moves the race in the upstream direction into contact with each ball bearing in the bearing assembly, and moves each ball in the assembly into contact with its inner bearing race. As a result, the force applied to the outer bearing race is transmitted through each ball to the inner bearing race. Because the inner bearing race is fixed to the shaft, the force is also transmitted to the shaft and urges the shaft in the upstream direction. And because the inner bearing race of the downstream bearing assembly is also fixed to the shaft, the force causes that inner race to move in the upstream direction into contact with each ball in its bearing assembly; and consequently causes each ball to move into contact with its outer bearing race. As a result of the inventive method, application of an axial force to the outer bearing race of one of the bearing assemblies causes the ball bearings of both bearing assemblies to move into line-on-line running contact with their respective bearing races, thereby reducing vibration within the bearing assemblies and in the shaft.

Other features and advantages of the invention will be apparent from the figures and the description of the best mode for carrying out the invention, as described below.

BRIEF DESCRIPTION OF THE DRAWINGS

The FIGURE is a cross-sectional view showing the bearing area of a gas turbine engine in accordance with the present invention.

BEST MODE FOR CARRYING OUT THE INVENTION

As indicated above, modem gas turbine engines include a fan section at the upstream end of the engine and a turbine section at the axially downstream end of the engine. Between the fan and turbine sections is a compressor section and a combustor section. A shaft extends axially through the engine. Engine designs are known that utilize only one shaft; other designs are known that utilize two or more shafts. The present invention has application to single as well as multi-shaft engines. In the FIGURE, the shaft is indicated by the reference numeral 12; its direction of rotation during engine operation is shown by the arrow marked with reference numeral 13.

The shaft 12 is supported by two bearing assemblies 16 and 18; as shown in the FIGURE, a first bearing assembly 16 (sometimes referred to herein as the upstream bearing assembly) is spaced axially upstream of the second bearing assembly 18 (sometimes referred to as the downstream bearing assembly). The bearing assemblies 16 and 18 are of the conventional ball bearing type, and include a pair of radially spaced apart bearing races, and a plurality of circumferentially spaced apart ball bearings therebetween. In particular, the upstream bearing assembly 16 includes an outer bearing race 20 and an inner bearing race 22 that cooperate to surround the ball bearings 24 and maintain them in an operating position. Likewise, the downstream bearing assembly 18 includes an outer bearing race 26, an inner bearing race 28, and the bearings 30.

With respect to the upstream bearing assembly 16, the inner race 22 is rotationally fixed to the shaft 12, preferably at the inner surface 32 of the race 22. The outer bearing race 20 is axially moveable with respect to the bearing support housing 36, and therefore, is moveable with respect to the shaft 12. With respect to the downstream bearing assembly 18, the inner bearing race 28 is rotationally fixed to the shaft 12, preferably at the inner surface 38 of the bearing race 28. The radially outer surface 72 of the outer bearing race 26 is fixed to the bearing support housing 36. The bearing support housing 36 is fixed to the engine case through an intermediate case 40. However, for purposes of this invention, the bearing support housing 36 may be directly attached to the engine case, or to any other support that is rigidly attached to the case. The engine case and shaft 12 are coaxial, and the axis of the engine is represented by the reference numeral 42.

The bearing support housing 36 is a one piece structure that extends between the bearing assemblies 16 and 18. The housing 36 is comprised of three portions; a first housing portion, indicated by the reference number 44, in the area of the upstream bearing assembly 16; a second housing portion, indicated by the reference number 46, in the area of the downstream bearing assembly 18; and a third housing portion, indicated by the reference number 48, in the area of attachment to the intermediate case 40.

The first housing portion 44 is defined by a thin metal wall 50 that forms a pair of closely spaced apart parallel legs 52, 54 which are also parallel to the shaft 12. The length of the parallel legs 52, 54 is approximately equal. The radially inner leg 54 includes a segment 56 that extends downstream from the bearing assembly 16, and a segment 58 that extends upstream from the bearing assembly 16. The inner leg 54 also includes, at the downstream end of segment 56, an L-shaped bend 60 which rests upon axially moveable piston 62 to provide an oil reservoir 64 for feeding the bearing 24. As seen in the FIGURE, the piston 62 is adjacent to the bearing race 20. The reservoir 64 is in communication with the ball bearings 24 through a channel (not shown) that extends from the reservoir 64 to the bearing race 22. The reservoir 64 also feeds the gap between the bearing race outer surface 63 and the housing inner surface 65. Oil sealing rings are shown at 67. Oil is fed into the reservoir 64 through an oil line 66 which extends through tube 61 and through an extension 71 in the housing 36. Oil line 66 also extends through tube 69 (partially shown) to provide lubrication to the bearings 30. Forward of the upstream bearing assembly 16, the inner leg 54 transitions into the outer leg 52 by means of a hairpin-type bend 68. The outer leg 52 parallels the inner leg 54; at a point downstream of the bearing assembly 16, and downstream of the parallel legs 52, 54, the first portion 44 of the housing 36 extends radially outward towards the intermediate case 40 and engine case.

The second portion 46 of the bearing housing 36 occupies the area near the downstream bearing assembly 18. The second housing portion 46 is defined by a wall 70 and is fixed to the assembly 18. The wall 70 extends axially upstream and radially outwardly from the bearing assembly 18 towards the engine case and intermediate case 40. In particular, the wall 70 is fixed to the outer race 26 by bolt 74 which passes through bolt holes (not shown) in the wall 70 and race 26.

The third housing portion 48 is comprised of a thick metal wall 80 that extends axially upstream and radially inwardly from the case 40. The third bearing housing portion 48 is fixed to the intermediate case 40 by bolts 75 which extend through bolt holes (not shown) in a radially extending land 76 of the third housing portion 48. The land 76 abuts a radially extending surface 82 in the intermediate case 40. The third portion 48 also includes axially extending tang 83 having surface 84 which abuts axially extending surface 86 on the intermediate case 40.

The first, second and third housing portions 44, 46, 48 meet at, and are contiguous from, a point located axially intermediate and radially outward of the first and second bearing assemblies 16, 18, respectively. The housing 36 is fabricated using known metalworking techniques; preferably, the first housing portion 44 is a combination of sheet metal and wrought components, welded together. The second and third housing portions 46, 48 are preferably a single piece casting or wrought metal component. The first housing portion 44 is joined to the second and third portions 46, 48 by welding or other conventional metal joining techniques. Titanium is the preferred material from which the housing 36 is fabricated.

The inner bearing race 22 is axially retained to the shaft 12 by a radially extending shoulder 88 on the shaft 12, and by a carbon seal assembly 90 on the upstream side of the bearing race 22. The carbon seal assembly 90 is axially retrained to the shaft 12 by the fan disk (not shown); it is also retained to the housing 36 by radially extending dog 91 which passes through slot 93 in the housing 36. As indicated above, the outer race 20 is axially slideable with respect to the housing 36, and oil is fed into the gap between the race 20 and the inner leg 54 of the housing 36 to provide oil damping. Relative axial movement between the race 20 and housing 36 is permitted by a dog and slot arrangement; in particular, a dog 94 in the race 20 passes through the slot 96 in the carbon seal outer race 98. The second bearing assembly 18 is axially fixed to the shaft 12 by a radially extending shoulder 92 on the shaft 12 at the downstream side of the inner bearing race 28, and by a lock nut assembly 99 attached to the shaft 12 at the upstream side of the bearing race 28.

As indicated above, a key function that bearing assemblies play in the engine is to allow the shaft to rotate, even at very high rotation speeds, with a minimum amount of vibration. The present invention minimizes such vibration by forcing the bearing races into tight contact with their respective ball bearings during engine operation. This is achieved by the aforementioned configuration of the bearing assemblies 16 and 18, the shaft 12, and the bearing housing 36. As set forth above, each of the radially inner races 22 and 18 of the two bearing assemblies 16 and 18, respectively, are fixed to the shaft 12; the radially outer race 20 of the bearing assembly 16 is moveable in the axial direction with respect to the housing 36 and the shaft 12, while the radially outer race 26 of the bearing assembly 18 is fixed to the housing 36. An axial force applied to the bearing race 20 results in axial loading of each of the balls 24, 30 in the bearing assemblies 16, 18. In particular, according to this invention, the bearing races 20, 22 of the first bearing assembly 16 are moved into line-on-line running contact with their respective ball bearings 24; likewise, the bearing races 26, 28 of the downstream bearing assembly 18 are moved into line-on-line running contact with their respective ball bearings 30. Such close contact is achieved by the use of pressurized oil to feed the oil reservoir 64. The pressurized oil in the reservoir 64 applies a force in the upstream direction onto the surface 100 of piston 62, and such force is then transmitted to the outer race 20, thereby causing the race 20 to move in the upstream direction. As the race 20 moves upstream, it contacts ball bearings 24 and moves the ball bearings 24 into contact with their inner race 22. Therefore, as a result of the application of force by the piston 62 onto the outer race 20, the race 20 contacts the ball bearings 24, and the bearings 24 contact the inner race 22. The transmission of the force from the outer race 20 to the inner race 22 occurs approximately along the line indicated by the reference numeral 102.

Because the inner race 22 is fixed to the shaft 12, the force which acts along the line 102 is also transmitted to the shaft 12, causing the shaft 12 to move in the upstream direction. Additionally, because the inner race 28 of the downstream bearing 18 is fixed to the shaft 12, as the shaft 12 moves in the upstream direction, so does the inner race 28. As the inner race 28 moves upstream, it contacts ball bearings 30 and moves the bearings 30 into contact with their inner race 26. Therefore, as a result of the application of force by the piston 62 onto the outer race 20, the shaft 12 moves in the upstream direction, the inner race 28 contacts the ball bearings 30, and the bearings 30 contact the inner race 26. The transmission of the force from the inner race 28 to the outer race 26 occurs approximately along the line indicated by the reference numeral 104.

Movement of the races 20, 22 and 26, 28, as described above, brings them into line-on-line running contact with their respective ball bearings 24, 30, and vibration in the bearing assemblies 16, 18 is minimized. Use of such a method and apparatus results in more efficient operation of the engine, as less energy is lost due to vibration. The amount of force applied by the piston 62 is controlled by the size of the piston 62 in conjunction with the magnitude of the pressure generated by the lubrication management system of the engine.

In the preferred embodiment of this invention, the downstream bearing assembly 18 is fixed to the bearing housing 36, while the upstream bearing assembly 16 is free to move axially with respect to the housing 36. Other bearing housing designs are known to those skilled in the art and may be adapted for use in the present invention of pressurizing the bearing assemblies. Furthermore, while the sliding arrangement of the outer bearing race 20 of the upstream bearing assembly 16 is preferred, other designs for facilitating axial movement of the outer bearing race 20 may be used.

Although this invention has been shown and described with respect to a preferred embodiment thereof, it will be understood by those skilled in the art that various changes in form and detail thereof may be made without departing from the spirit and scope of the claimed invention. For example, the bearing support housing of this invention is applicable to single shaft turbomachines as well as multi-shaft machines. The invention is useful in engines that are used to power aircraft such as airplanes and helicopter, as well as applications outside the aerospace field. And while the housing is preferably fabricated from titanium, other metal alloys may be used, as well as nonmetallic materials such as composites.

I claim:

1. In a turbomachine having an axis of rotation, the turbomachine comprising a lubrication management system that generates an oil pressure, and further comprising a shaft supported by upstream and downstream axially spaced apart bearing assemblies within an engine case and a bearing housing fixed to the engine case, wherein each of the bearing assemblies is comprised of a pair of radially spaced apart bearing races and a plurality of ball bearings therebetween, the turbomachine constructed and arranged such that the radially inner bearing race of each pair of bearing assemblies is fixed to the shaft, and the radially outer bearing race of the upstream bearing assembly is axially moveable with respect to the housing, and the radially outer bearing race of the downstream bearing assembly is fixed to the housing; a method for axially loading each of the bearing assemblies, comprising the steps of:

utilizing said oil pressure to apply a force in an axial direction to the outer race of the upstream bearing assembly, thereby moving the outer race of the upstream bearing assembly in the axial direction into contact with the balls of the upstream bearing assembly, wherein the force application step moves the balls of the upstream bearing assembly into contact with the inner race of the upstream bearing assembly, whereby the force is transmitted from the outer race of the upstream bearing assembly to the inner race of the upstream bearing assembly; and applying the transmitted force from the inner race of the upstream bearing assembly to the shaft such that the shaft moves in axial direction, wherein the force transmission step moves the inner race of the downstream bearing assembly into contact with the balls of the downstream bearing assembly, thereby moving the balls of the downstream bearing assembly into contact with the outer race of the downstream bearing assembly, whereby the force is transmitted from the shaft to the inner race of the downstream bearing assembly, and from the inner race of the downstream bearing assembly to the outer race of the downstream bearing assembly.

2. A turbomachine having a lubrication management system that generates an oil pressure, the turbomachine comprising:

a shaft supported by upstream and downstream axially spaced apart ball bearing assemblies within an engine case, wherein each bearing assembly is comprised of a pair of radially spaced apart bearing races and a plurality of ball bearings therebetween;

a bearing housing fixed to the engine case, wherein the radially outer bearing race of the upstream bearing assembly is axially moveable with respect to the housing, the radially outer bearing race of the downstream bearing assembly is axially and rotationally fixed to the housing and the radially inner bearing race of each bearing assembly is fixed to the shaft whereby a force applied in the axially upstream direction to the outer bearing race of the upstream bearing assembly moves the upstream outer bearing race into contact with its respective balls, which in turn contact their respective upstream inner bearing race to move the shaft in the upstream direction along with the inner bearing race of the downstream bearing assembly to move the downstream inner bearing race into contact with its respective balls, which in turn contact their respective downstream outer bearing race to transmit the force thereto; and a piston in fluid communication with the oil pressure generated by the lubrication management system for applying the force in the axially upstream direction to the outer bearing race of the upstream bearing assembly.

3. The turbomachine of claim 2, wherein the means for applying the force to the outer bearing race of the upstream bearing assembly comprises means for delivering pressurized oil against a moveable piston adjacent to the outer bearing race.

4. The turbomachine of claim 2, wherein the bearing housing is a one piece structure extending between the bearing assemblies.

* * * * *

UNITED STATES PATENT AND TRADEMARK OFFICE
CERTIFICATE OF CORRECTION

PATENT NO. : 5,603,602
DATED : Feb. 18, 1997
INVENTOR(S) : Giuseppe Romani

It is certified that error appears in the above-indentified patent and that said Letters Patent is hereby corrected as shown below:

claim 1, column 6, line 11, insert --the-- between "in" and "axial"

Signed and Sealed this

Twelfth Day of August, 1997

Attest:

BRUCE LEHMAN

Attesting Officer

Commissioner of Patents and Trademarks